(12) United States Patent
Barber

(10) Patent No.: US 9,172,691 B2
(45) Date of Patent: Oct. 27, 2015

(54) SYSTEM FOR SECURE ENROLLMENT AND SECURE VERIFICATION OF NETWORK USERS BY A CENTRALIZED IDENTIFICATION SERVICE

(71) Applicant: Kount Inc., Boise, ID (US)

(72) Inventor: Timothy P. Barber, Boise (ID)

(73) Assignee: Kount Inc., Boise, ID (US)

( * ) Notice: Subject to any disclaimer, the term of this patent is extended or adjusted under 35 U.S.C. 154(b) by 80 days.

(21) Appl. No.: 14/193,459

(22) Filed: Feb. 28, 2014

(65) Prior Publication Data

US 2014/0181906 A1 Jun. 26, 2014

Related U.S. Application Data

(62) Division of application No. 10/144,447, filed on May 10, 2002, now Pat. No. 8,701,170.

(60) Provisional application No. 60/290,249, filed on May 11, 2001.

(51) Int. Cl.
*H04L 29/06* (2006.01)
*G06Q 30/06* (2012.01)

(52) U.S. Cl.
CPC ............... *H04L 63/08* (2013.01); *G06Q 30/06* (2013.01); *H04L 63/126* (2013.01)

(58) Field of Classification Search
CPC ... H04L 63/08; H04L 63/126; H04L 63/0428; H04L 63/0853; H04L 63/1483; H04L 63/1441; G06Q 30/06; H04W 12/08; H04W 12/06; G06F 21/36; G06F 21/83; G06F 2221/2107; G06F 2221/2117; G06F 2221/2119
See application file for complete search history.

(56) References Cited

U.S. PATENT DOCUMENTS

| | | |
|---|---|---|
| 5,944,824 A | 8/1999 | He |
| 5,961,593 A | 10/1999 | Gabber et al. |
| 6,182,229 B1 | 1/2001 | Nielsen |
| 6,275,944 B1 | 8/2001 | Kao et al. |
| 6,496,855 B1 | 12/2002 | Hunt et al. |
| 6,510,236 B1 | 1/2003 | Crane et al. |
| 6,668,322 B1 | 12/2003 | Wood et al. |
| 6,996,718 B1 | 2/2006 | Henry et al. |
| 7,039,714 B1 | 5/2006 | Blakley, III et al. |
| 7,155,739 B2 | 12/2006 | Bari et al. |
| 7,356,833 B2 | 4/2008 | Byrne |
| 7,603,565 B2 | 10/2009 | Baird, III et al. |
| 2002/0038426 A1 | 3/2002 | Pettersson et al. |
| 2002/0156905 A1 | 10/2002 | Weissman |
| 2002/0162009 A1* | 10/2002 | Shmueli et al. ............... 713/200 |
| 2005/0044042 A1* | 2/2005 | Mendiola et al. ............... 705/42 |

OTHER PUBLICATIONS

United States Office Action, U.S. Appl. No. 14/193,450, Jul. 17, 2014, five pages.

* cited by examiner

*Primary Examiner* — Saleh Najjar
*Assistant Examiner* — Shu Chun Gao
(74) *Attorney, Agent, or Firm* — Fenwick & West LLP

(57) ABSTRACT

A system and method for providing, as a service over a computer network (especially a packet-switched computer network) to a body of merchants connected to the computer network, verification of consumer identification based on data provided over the computer network by scanning devices attached to the computers operated by consumers.

20 Claims, 2 Drawing Sheets

SYSTEM FOR SECURE ENROLLMENT AND SECURE VERIFICATION OF NETWORK USERS BY A CENTRALIZED IDENTIFICATION SERVICE

CROSS-REFERENCE TO RELATED APPLICATIONS

This application is a divisional of co-pending U.S. patent application Ser. No. 10/144,447, filed on May 10, 2002, which claims priority under 35 U.S.C. §119(e) to U.S. Provisional Patent Application No. 60/290,249, filed on May 11, 2001, entitled "SYSTEM FOR SECURE ENROLLMENT AND SECURE VERIFICATION OF NETWORK USERS BY A CENTRALIZED IDENTIFICATION DEVICE," all of which are hereby incorporated by reference in their entirety.

BACKGROUND

1. Field of the Invention

The present invention relates to communications over a computer network. More particularly, the present invention relates to systems for enabling commerce over a computer network and especially over a packet-switched computer network, such as the Internet but not restricted to the Internet.

2. Background of the Invention

Two familiar features of the networked economy are "usernames" and "passwords." In exchange for services, millions of consumers have opened virtual user accounts with many thousands of merchants connected to the network. For the sake of convenience, consumers frequently choose simple passwords that they can remember easily. As a result such passwords often provide only minimal security.

The manufacturers of new identity scanning devices promise to close this security hole. A consumer may choose from smart scanners, DNA scanners, voice scanners, and other devices that interface with the consumer's computer (i.e. are attached to the consumer's computer) and so provide information sufficient to confirm the consumer's identity to a remote third party. If you have such a device, then in theory you could identify yourself to any business connected to the network.

However, in practice it is not feasible for every merchant on the network to install software to communicate (remotely) with every such scanning device so as to be able to obtain the information from the scanning devices needed to verify the identity of consumers. Moreover, for reasons of safety and privacy it is not desirable for multiple merchants to be stockpiling the sensitive data these devices collect and transmit.

What is needed is a system by which the identity of a consumer can be verified for a merchant based on information from a scanning device attached to the consumer's computer, without the merchant having to provide software to obtain the information from the scanning device (since then every merchant would be compelled to have such software for possibly many different scanning devices.

SUMMARY OF THE INVENTION

Accordingly, the present invention provides a system for verifying over a computer network the identity of each of a plurality of consumers on behalf of one or another of a plurality of merchants, the system comprising: an identification hub, responsive to a username of a consumer, a merchant identifier, and output from a scanning device attached to a computer operated by the consumer and connected to the identification hub via the computer network, wherein the identification hub hosts a database in which previously obtained scanning results for consumers are stored on behalf of merchants, each scanning result being indexed by a consumer-merchant pairing, and further wherein in response to a username of a consumer, a merchant identifier, and output from the scanning device attached to the computer operated by the consumer the identification hub provides over the computer network on behalf of the consumer a password to a computer operated by the merchant provided that the output from the scanning device matches the previously obtained scanning results for the consumer whose identity is being verified.

In another aspect of the invention, the consumer computer interacts with the hub and with the merchant computer using a network communications computer program, which is able to be redirected from the hub to the merchant computer and vice versa, and wherein a password is provided to the merchant in the course of redirecting the consumer to the merchant computer.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
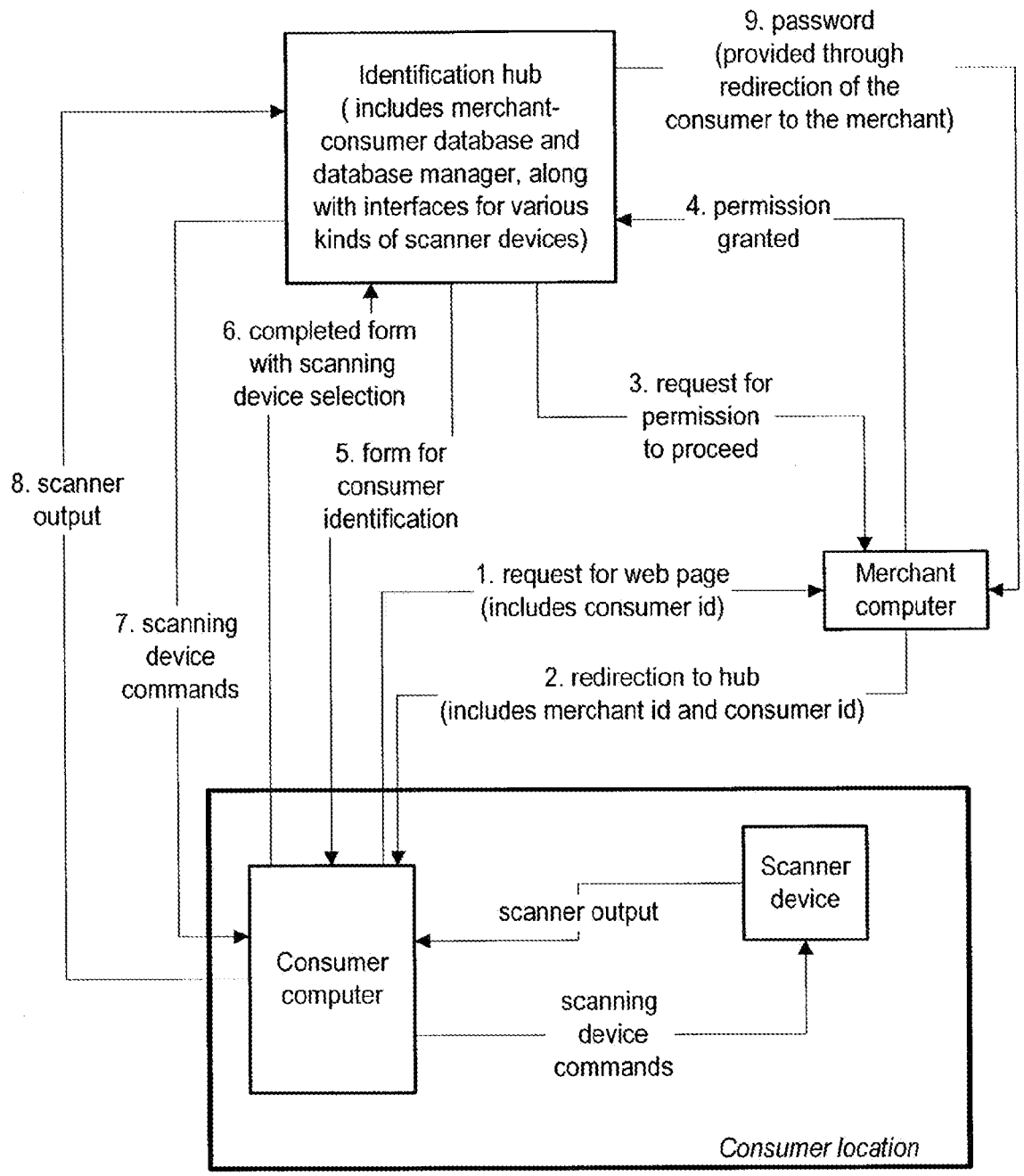
FIG. 1 is a block diagram/flow diagram of a system for verifying the identity of consumers to merchants when the consumers have scanning devices attached to computers operated by the consumers, the system including as a principal component an identification hub used by the merchants to acquire and interpret the output of the scanning devices.

The invention will here be described in the context of merchant computers and consumer computers communicating over the World Wide Web of the Internet, but the invention should be understood to be useful in the context of any computer network, especially a packet-switched computer network, connecting merchant computers to consumer computers, with or without a program analogous to the World Wide Web to enable communications between the merchant computers and the consumer computers. The description below indicates that a consumer uses a browser for accessing various web sites of the World Wide Web and that in the course of verifying the identity of a consumer, the consumer's browser is "redirected" from one web site to another. The invention is not limited to a context in which the consumer operates a browser that can be redirect; it should be understood to comprehend mechanisms analogous to redirection, i.e. any mechanism by which the consumer computer is made by a server at a first web site to access a server at a second web site.

In the preferred embodiment, the present invention specifies a protocol that enables merchants on the Internet and interconnected by the World Wide Web to use the services of a central "identification hub" (a server also on the Internet) that supports (i.e. interfaces with) many different kinds of identity scanning devices so as to be able to obtain scanning information from the devices, scanning devices such as smart cards, fingerprint scanners, hand scanners, retina scanners, DNA scanners, and voice scanners. When a consumer first sets up an account with a participating merchant, the consumer provides to the hub scanning information from one or another scanning device attached to the consumer's computer and provides to the hub the consumer's supposedly true identity (for accounting purposes, at any rate). The hub then assigns an essentially un-guessable random password to the consumer account with the merchant, and associates the scanning information with the password. When a returning consumer wishes to confirm his identity to a particular merchant, the hub initiates an identity scan using a scanning device attached to the consumer's computer, confirms the consumer's identity using information provided by the scanning device, and transmits the corresponding assigned password (stored in the account at the hub) to the particular merchant. In effect, the hub eliminates the need for the consumer to create or remember a password, while still maintaining backward compatibility with all existing password-based user account systems, and eliminates the need for the merchant to operate software that can interface with scanning devices.

According to the invention, in the preferred embodiment, merchants who are clients of the identification hub interact with the hub so as to verify the identity of a consumer by using the following URL's as explained below:

1) a verification URL (uniform resource locator), assigned by the identification hub;
2) a merchant identification number, assigned by the identification hub;
3) a confirm URL, selected by the merchant;
4) a failure URL, selected by the merchant; and
5) a success URL, selected by the merchant.

For the sake of illustration, suppose that the hub's verification URL is http://www.[HUB].com/verify/.

Suppose further that the merchant has an id number of 12345678, that the merchant's confirm URL is http://www.[MERCHANT].com/confirm/
That the merchant's failure URL is
http://www.[MERCHANT].com/failure/
And the merchant's success URL is
http//www.[MERCHANT].com/success/.

Suppose further that a consumer with (unique) username "joesmith" (assigned by the merchant or invented by the consumer and checked as unique by the merchant) has an account with the merchant (who in turn has a unique merchant ID assigned by the hub or invented by the merchant and checked as unique by the hub). Then according to the invention, the identity of the consumer is verified for the merchant in the following steps.

STEP 1. Merchant Directs Consumer to Verification URL (at Hub).

According to the invention a participating merchant maintains a special location (for hosting information or programs) on the computer network (e.g. a web page) that acts as the access point for consumers using scanning devices. From the special location, the merchant directs the consumer's network-browsing software (used to traverse the World Wide Web) to the location indicated by the verification URL (a location at the identification hub).

EXAMPLE: The merchant may have a web page where a consumer can enter a user name, after which the merchant software on the server hosting the web page directs the consumer to the (location indicated by the) verification URL.

A request for verification passed to the verification URL preferably includes four parameters: the merchant id (m); the consumer username (c); a random seed (r); and a new-account flag (n). The random seed (r) should consist of a string of eight or more random alphanumeric characters chosen by the merchant. The new-account flag (n) should be set (by the merchant) to "0" by 5 default, and should be set to "1" if and only if the merchant wishes for the user (c) to be added as a new account, or if the merchant wishes to replace an existing account of the same name.

EXAMPLE: The merchant directs the consumer to the following web address: https://www.[HUB].com/verify/?m=12345678&c=joesmith&r=a65dfveg&n=1. in which https indicates secure hypertext transfer protocol, as opposed to plain http. (Plain http could also be used according to the invention, but secure http is preferable since the password and random seed should be transmitted securely from point to point. The scanning output, on the other hand, is sent directly to the hub by a channel (some TCP/IP compatible protocol) specific to that device, not (usually) https. As an aside, when you request a page via http, all information in that request becomes public knowledge, so that in principle anyone is able to read the request right off the network. When you request a page via https, the only thing that is public (not encrypted) in the request is the domain name you are trying to reach (i.e. the web page you are requesting by specifying a domain name). All other information in the request is encrypted (including the directory name, filename, and any data on the end of the URL). In other words, making an https request with data appended to the URL is also a way to securely transmit the data to another machine.}

Step 2: Hub Obtains Confirmation from Merchant that Merchant has Requested Hub Verify Identity of Consumer.

When the hub receives a request to verify the identity of a consumer, the hub attempts to connect to the merchant and request confirmation from the merchant that the merchant is indeed the party initiating the consumer identification request. The request for confirmation is directed to the merchant's confirmation URL, and includes all four parameters passed to the hub presumably by the merchant.

EXAMPLE: The hub attempts to connect to the following web address: https://www.[merchant].com/confirm/?m=12345678&c=joesmith&r=4ecf39aOc&n=1 In response to a request to confirm, the merchant's machine attempts to verify all four parameters, then replies with a simple: "1" (confirmed), or "0" (failure). A failure to reply within a reasonable span of time is also interpreted as "0" (failure). If failure is indicated by the merchant to the hub, the hub directs the consumer's network browsing software to the merchant's failure URL, appending in the process of redirection 20 all four original parameters (m,c,r,n) and also an error flag. The error flag is set to a predefined value that indicates to the merchant software at the merchant's failure URL the nature of the failure (e.g., "NOCONFIRM").

EXAMPLE: Upon failure the consumer's web browsing software is redirected to the following merchant's failure URL using the following redirection command: https://www.[MERCHANT].com/failure/?m=12345678&c=joesmith&r=a65dfveg&n=1&e=NOCONFIRM Step 3: Select Scanning Device If the merchant confirms that the merchant has indeed requested that the hub verify the identity of a consumer, then with the consumer having been (already, in step 1 above) redirected to the verification URL at the hub, the consumer's network browsing software requests a reply from the hub to the verification request. The hub replies with a message that includes a list of one or more identification scanning devices. For example, the reply may be in the form of a web page in hypertext markup language (html) that includes a list of scanning devices from which the consumer is to select to indicate the type of scanning device attached to the consumer's computer. The consumer selects the appropriate identification scanning device from the list, and the consumer's browser then transmits the selection back to the hub.

Step 4: Perform Scan

When the consumer's network browsing software specifies to the hub a particular type of scanning device, the hub replies with a message that includes device-specific instructions that will cause the consumer's computer to activate the scanning device attached to the consumer's computer. The scanning device commands may be issued for example via executable objects (browser plug-ins) embedded in a web page (in this case, a web page presented by the hub to the consumer) The consumer's scanning device activates, performs a scan, and transmits the scanning output back to the hub.

Step 5: Construct Unique Hub Account Identification

With a verification request made (indirectly) by a merchant of the hub (made by redirecting a consumer to the hub), the hub is passed a merchant id and a consumer id (in the course of the redirection). According to the invention, the hub then attempts to associate the merchant-consumer pair with a unique identifier x, generated by the hub for example by simply concatenating the (unique) merchant id and the (unique) consumer id. If no such hub account exists, then a new one is created on the fly, following a methodology that determines the unique account given the unique merchant ID and the consumer's username, such as by concatenating the merchant ID with the consumer's username. Alternatively, as explained below, the hub can be made (by the merchant) to create a new account even if one already exists.

Step 6(A): If New-Account Flag was Set to "1", then Create New Consumer Account.

1) Delete existing account with id x (if any).

2) Generate a new random password p (16 random alphanumeric characters).

3) Create a new account with id x (same account identifier as before, since computed from the consumer username and merchant ID in the same way as before).

Store new password.
Store device type.
Store new identification data (generated by device).

4) Send message to consumer's machine to redirect consumer's network browsing software to the merchant's success URL. In the message, also pass the merchant id, the consumer id, the random seed, the new-account flag, and the newly generated password (as parameters).

EXAMPLE: Upon completion, the consumer's web browsing software is redirected to the following URL: https://www.[MERCHANT].com/success/?m=12345678&c=joesmith&r=4ecf39aOc&n=1&p=DJ9RDAB8X11FQ7EJ There are a few reasons for having a new-account flag. First, some scanning devices need to know whether they are dealing with a new user (performing a first scan of a user) or an old user (already scanned once), because they perform a scan slightly differently the first time (slower, more accurately). If an account is new, there is no issue in this respect, but if an account already exists, then the hub needs to be told (by the merchant, via the new-account flag) so that it can trigger the correct type of scan. Secondly, consumers may change scanning devices from time to time. If a consumer has purchased a new scanning device, then the scanning results on file for the consumer are no longer valid, and the hub must be made to reset the scanning results (i.e. replace them with new scanning results), which is done using the new-account flag. On the other hand, if a consumer who has an account at the hub holding scanning results from one device is temporarily using a computer with a different scanning device attached to it (but giving the same kind of scan, such as a DNA scan), the account at the hub should usually not be reset, and by using a new-account flag, there is flexibility to decide whether or not to reset an account in such a situation.

STEP 6(B): If New-Account Flag was Set to "0", then Verify Existing Consumer Account.

1) Compare freshly obtained (scanned) data against identity data in account x using comparison method associated with the selected device.

2) If no match, then send message to consumer's machine to redirect consumer to merchant's failure URL. In the message include the merchant id, the consumer id, the random seed, the new-account flag, and an error flag as parameters. Set the error flag to a predefined value that indicates to the merchant the nature of the failure (e.g. "NOMATCH").

EXAMPLE: Upon failure, the consumer's web browsing software is redirected to the following URL: https://www.[MERCHANT].com/failure/?m=12345678&c=joesmith&r=a65dfveg&n=O&e= NOMATCH 3) If a match, then send a message to the consumer's machine to redirect the consumer to the merchant's success URL. Include in the message the merchant id, the consumer id, the random seed, the new-account flag, and the password (as parameters).

EXAMPLE: Upon success, the consumer's web browsing software is redirected to the following URL: https://www.[MERCHANT].com/success/?m=12345678&c=joesmith&r=4ecf39aOc&n=O&p=DJ9RDAB8X11FQ7EJ Referring now to FIG. 1, a block diagram/flow diagram of a system according to the invention is shown, indicating the data flows between modules in the situation where the hub has a satisfactory account for the consumer/merchant combination, and the consumer is the person the consumer claims to be, i.e. the scanning output agrees with the scanning data on file with the hub in the consumer-merchant account. The data flows between the three principal entities, the verification hub facility, a representative merchant facility, and a representative consumer facility (computer and attached scanning device), are numbered to indicate the relative order in which they occur. (Data flows internal to the consumer facility, i.e. between the consumer computer and the attached scanning device, are not numbered.}

Figure 2:
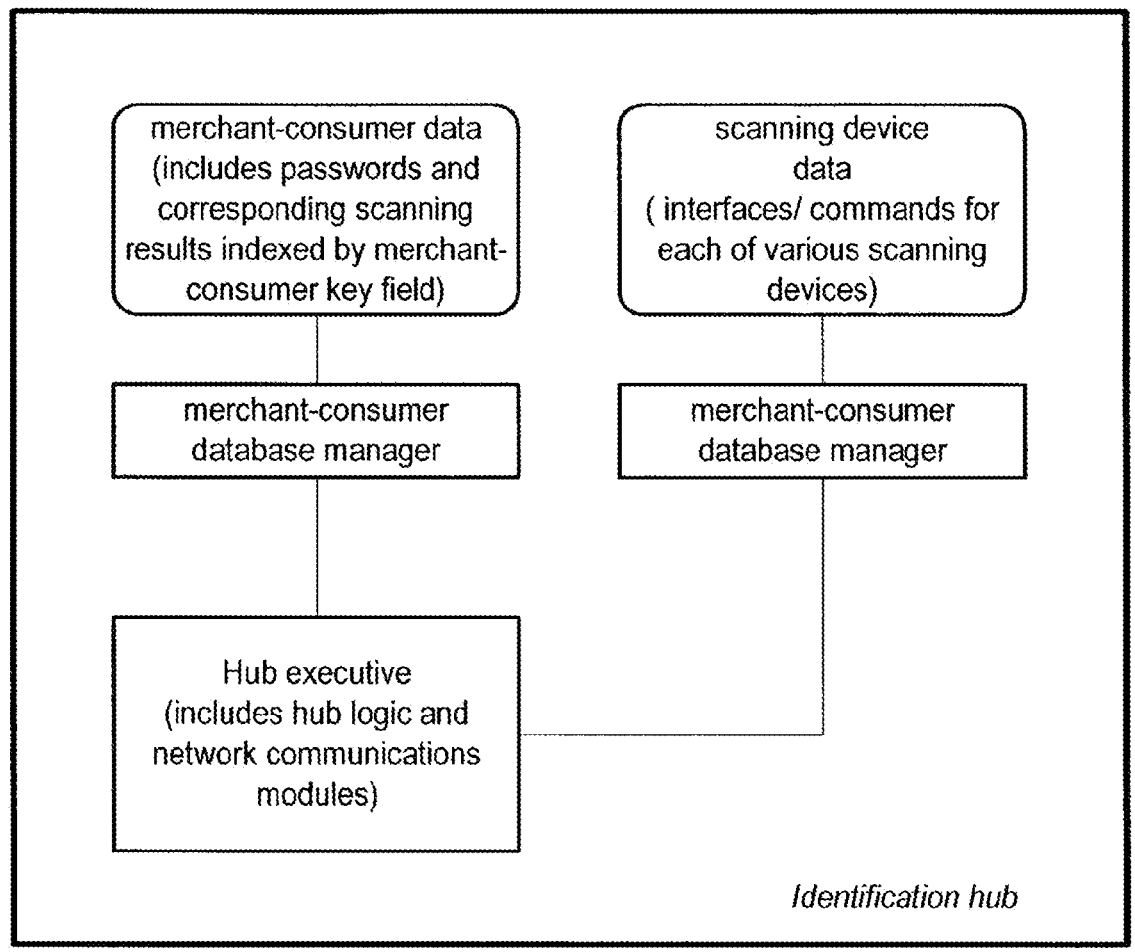
FIG. 2 is a block diagram of the identification hub of FIG. 1 in more detail.

Referring now to FIG. 2, a block diagram of the identification hub is shown in more detail as including: a hub executive that includes the hub logic (for interfacing with merchants and consumers, and for determining whether scanning outputs provided by a consumer do in fact match the scanning results already on file for supposedly the same consumer, as well as for setting up merchant-consumer accounts and for performing other housekeeping chores) and also enables communications over the computer network; a merchant-consumer data store and associated database manager, the data store for holding scanning results for consumers indexed by a key filed constructed from the consumer username and the merchant identifier (or alternatively indexed by both the consumer username and the merchant identifier as separate key fields, both necessary), and including the previously deposited scanning results for consumers (stored on behalf of the participating merchants), along with the corresponding (essentially) un-guessable passwords to be provided to the merchants in case of a successful match of scanning output for a consumer with the scanning results already on file in the database; and a scanning device data store and associated database manager, the scanning device data including for each of many different kinds and makes of scanning devices information sufficient to enable the hub executive to command any of the scanning devices included in the data store to scan a consumer and produce the scanning output of a scan of the consumer.

Discussion

In another embodiment of the invention, an embodiment that is in fact the preferred embodiment, the steps 2 (request by the hub that the merchant confirm a verification request) and 3 (determining what kind of scanning device the consumer is using) are not performed in the order indicated, one after the other. Instead, step 3 is initiated first (i.e. the hub sends a list of devices to the consumer for the consumer to indicate which device on the list the consumer is using), then step 2 is initiated. The hub then proceeds to step 4 only after both step 2 and step 3 have completed successfully. The advantage of such a procedure is that the hub delivers the list of scanning devices to the consumer immediately, and then confirms the validation request from the merchant (in the background) while the consumer makes a selection, which is preferable to the rigid sequence indicated above.

As an alternative embodiment, without significant loss of security the hub could actually skip step 2, but only if the new-account flag is set to O. However, in general step 2 is desirable because it would help discourage certain types of denial-of-service attacks on the hub (such as flooding the hub with bogus verification requests).

In another alternative embodiment, instead of having the consumer in step 3 select from the list of scanning devices the type of device the consumer is using, a script is embedded in the web page sent to the consumer to determine the scanning device used by the consumer, and the script determines the type of scanning device automatically (without assistance by the consumer), and provides the determination to the hub. For example, the script could make calls to the operating system to determine the hardware connected to the computer.

Scope of the Invention

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A computer-implemented method for enrolling consumers, the method comprising:
   receiving a request to enroll a consumer, the request including a merchant identifier uniquely identifying a merchant of a plurality of merchants and an identity of the consumer;
   determining that the identity of the consumer in the request is for a new account; and
   responsive to the determination that the identity of the consumer in the request is for a new account:
   instructing the consumer associated with the identity to perform a scan from a scanning device for verification at the merchant;
   receiving a scanning result from the consumer;
   storing the scanning result as a verification data item that is associated with the merchant identifier and the identity of the consumer in the request;
   generating a random value uniquely identifying the verification data item; and
   transmitting the random value to the merchant as a verification of the consumer.

2. The method of claim 1, further comprising:
   confirming with the merchant associated with the merchant identifier that the request to enroll the consumer is initiated by the merchant.

3. The method of claim 1, wherein storing the scanning result comprises replacing a previously stored verification data item associated with the merchant identifier and the identity of the consumer with the scanning result.

4. The method of claim 1, wherein the verification data item associated with the merchant identifier and the identity of the consumer is stored in a database storing a plurality of verification data items for a plurality of consumers, a verification data item being associated with a merchant identifier of a merchant and an identity of a consumer enrolled at the merchant.

5. The method of claim 4, wherein each verification data item of the plurality of verification data items stored in the database is uniquely identified by a random value generated from a random seed.

6. The method of claim 1, further comprising:
   retrieving a random seed included in the request;
   generating a random value based on the retrieved random seed for the verification data item associated with the merchant identifier and the identity of the consumer.

7. The method of claim 1, wherein determining that the identity of the consumer in the request is for a new account comprising:
   retrieving a new account indicator from the request, the value of the indicator being set by the merchant identified in the request.

8. The method of claim 1, further comprising:
   responsive to the determination that the identity of the consumer in the request is not for a new account:
   instructing the consumer to select a scanning device from a list of scanning devices;
   transmitting device-specific instructions to the consumer to activate the selected scanning device;
   receiving a scanning result from the consumer using the selected scanning device based on the device-specific instructions; and
   determining whether the scanning result matches verification data item associated with the merchant identifier and the consumer username.

9. The method of claim 8, further comprising:
   in response to the scanning result not matching the verification data item, directing the consumer to an error web page at the merchant indicating that the scanning result does not match a stored verification data item.

10. The method of claim 1, wherein generating the random value uniquely identifying the verification data item comprises:
    receiving a string of a plurality of random alphanumeric characters selected by the merchant; and
    generating the random value using the string the random seed.

11. The computer readable storage medium of claim 10, wherein the program code for generating a random value uniquely identifying the verification data item comprises code for:
    receiving a string of a plurality of random alphanumeric characters selected by the merchant;
    generating the random value using the string the random seed.

12. A non-transitory computer readable storage medium storing program code executed by a computer processor, comprising code for:
    receiving a request to enroll a consumer, the request including a merchant identifier uniquely identifying a merchant of a plurality of merchants and an identity of the consumer;
    determining that the identity of the consumer in the request is for a new account;

responsive to the determination that the identity of the consumer in the request is for a new account:
- instructing the consumer associated with the username to perform a scan from a scanning device for verification at the merchant;
- receiving a scanning result from the consumer;
- storing the scanning result as a verification data item that is associated with the merchant identifier and the identity of the consumer in the request;
- generating a random value uniquely identifying the verification data item; and
- transmitting the random value to the merchant as a verification of the consumer.

13. The computer readable storage medium of claim 12, further comprising program code for:
- confirming with the merchant associated with the merchant identifier that the request to enroll the consumer is initiated by the merchant.

14. The computer readable storage medium of claim 12, wherein the program code for storing the scanning result comprises code for replacing a previously stored verification data item associated with the merchant identifier and the identity of the consumer with the scanning result.

15. The computer readable storage medium of claim 12, wherein the verification data item associated with the merchant identifier and the identity of the consumer is stored in a database storing a plurality of verification data items for a plurality of consumers, a verification data item being associated with a merchant identifier of a merchant and an identity of a consumer enrolled at the merchant and a verification data item being uniquely identified by a random value generated from a random seed.

16. The computer readable storage medium of claim 12, further comprising program code for:
- retrieving a random seed included in the request;
- generating a random value based on the retrieved random seed for the verification data item associated with the merchant identifier and the identity of the consumer.

17. The computer readable storage medium of claim 12, wherein the program code for determining that the identity of the consumer in the request is for a new account comprises code for:
- retrieving a new account indicator from the request, the value of the indicator being set by the merchant identified in the request.

18. The computer readable storage medium of claim 17, further comprising program code for:
- determining that the new account is for an existing consumer identified by the identity of the consumer in the request; and
- replacing a previously stored verification data item associated with the existing account of the consumer with the verification data item identified by the random value.

19. The computer readable storage medium of claim 12, further comprising program code for:
responsive to the determination that the identity of the consumer in the request is not for a new account:
- instructing the consumer to select a scanning device from a list of scanning devices;
- transmitting device-specific instructions to the consumer to activate the selected scanning device;
- receiving a scanning result from the consumer using the selected scanning device based on the device-specific instructions; and
- determining whether the scanning result matches verification data item associated with the merchant identifier and the identity of the consumer.

20. The computer readable storage medium of claim 19, further comprising program code for:
- in response to the scanning result not matching the verification data item, directing the consumer to an error web page at the merchant indicating that the scanning result does not match a stored verification data item.

* * * * *